April 25, 1967  M. TROUBETZKOI  3,316,450
ADJUSTABLE FLASH FOR PHOTOGRAPHY
Filed Aug. 26, 1963  3 Sheets-Sheet 2

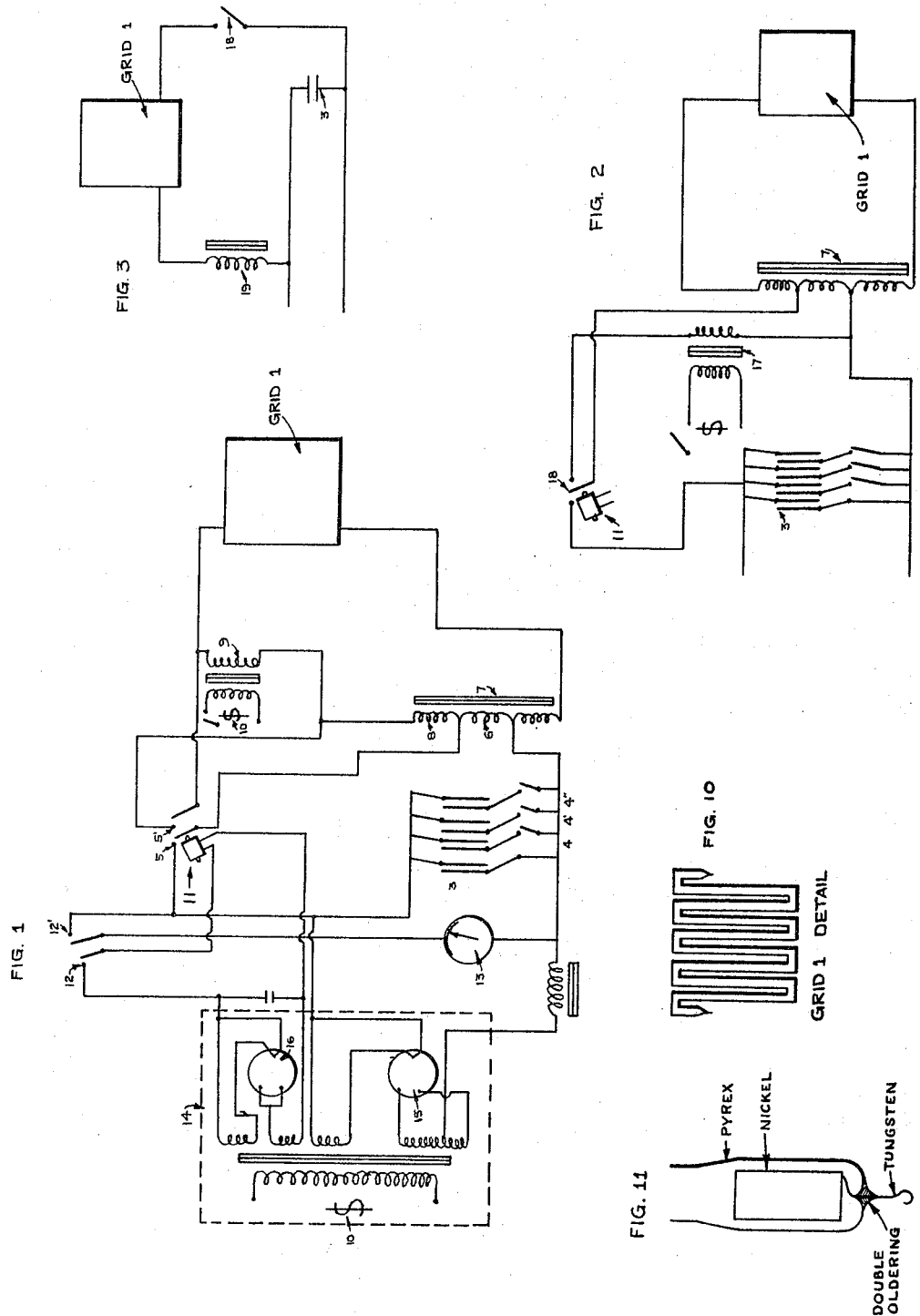

INVENTOR: MICHEL TROUBETZKOÏ
AGENT: Pierre Lespérance

April 25, 1967   M. TROUBETZKOI   3,316,450
ADJUSTABLE FLASH FOR PHOTOGRAPHY
Filed Aug. 26, 1963   3 Sheets-Sheet 3

INVENTOR: MICHEL TROUBETZKOÏ
AGENT: Pierre Lespérance

United States Patent Office 3,316,450
Patented Apr. 25, 1967

3,316,450
ADJUSTABLE FLASH FOR PHOTOGRAPHY
Michel Troubetzkoi, 4054 Dorchester Blvd. W.,
Montreal, Quebec, Canada
Filed Aug. 26, 1963, Ser. No. 304,428
2 Claims. (Cl. 315—239)

The present invention relates to a method and means for obtaining an adjustable flash for photography.

The method and means of the present invention enable to obtain the following advantages:

(1) The desired colour and light intensity.

(2) A better distribution of light, the elimination of the focusing and synchronization, and the reduction of glare and reflection.

(3) A better penetration of the colour film through its several photographic layers.

(4) The elimination of the well-known Schwartzenshield's law. (Film desintegration, due to excessive light intensity.)

(5) The elimination of the additional light, called "pilot lamp"; one light source being used for two purposes; for setting-point, and for light projected on the subject.

(6) The elimination of frosted glass for photographic magnifiers. Frosted glass absorbs up to 93 percent of light intensity.

(7) The elimination of any other kind of light source and also of voluminous light condensers.

The electronic flash is well-known and widely spread. It is based on the ionization principle of gas. In most cases, xenon is the gas used. It is an excellent electric insulator but becomes a very good electric conductor when ionized. For this reason, a tube with three electrodes is used: two electrodes at each end are connected to a condenser; the third one is used for ionization.

When ionization takes place, a spontaneous discharge, comparable to lightning, occurs between the two ends, producing a very intense, but very rapid flash (of the order of a few micro-seconds).

This great speed has given a strong impulse to photography, but the speed and the colour of this light cannot be used in all cases.

If a very strong light is necessary, one cannot use an electronic flash because of the Schwartzenshield's law (film desintegration). On the other hand, the particular colour of light produced cannot be adopted to all cases. Moreover, when using the electronic flash, the synchronization and settings are extremely difficult to attain.

French Patent No. 1,276,781, in my name, dated Oct. 16, 1961, describes a method and an apparatus producing luminous flashes of strong intensity and of predetermined duration, by way of conventional fluorescent tubes with rare gases (high or low voltage) used for publicity or lighting purposes, supplied with a magnitude of current much higher than the magnitude of current which they can admit while in permanent use. According to the method described in the above-mentioned patent, the electrical impulse is produced by the discharge of a battery of condensers into a circuit, including an electrical apparatus having a well determined self-inductance, and tubes mounted in series, which produce a flash of a predetermined duration.

In the French patent, the self-inductance is a transformer inserted between the tubes and the battery of condensers, said transformer built to operate with a 60-cycle current the duration of the flash will be about $\frac{1}{60}$ of a second. This "slow" flash penetrates much better photographic emulsions than the conventional electronic flashes, which produce a flash having duration from some microseconds to a few milliseconds.

The present invention concerns new improvements to these methods and devices; these improvements allowing a more practical use of the tubes and a wider field of application.

It is known that in many fields of photography, and more particularly with photoengraving, before the picture is taken, some considerable time must be spent in adjusting and fixing up the settings, during which periods, the subject to be photographed is lighted by means of one or several pilot lamps. These lamps cannot be placed in the exact location of the flash lamps. Therefore, their lighting is not only different in intensity, but also in the orientation and distribution of the light given by the flashlamps when the picture is taken.

The present invention provides the means for correcting these drawbacks. According to one way of realization in addition to the system for operating the fluorescent tubes under normal conditions of voltage and current, when used for adjusting and setting, provision is made for the additional supply system of high amperage used for the production of flashes by means of the same tubes.

Thus, during the adjusting and setting up period, as well as while the picture is being taken, the shape, expanse and distribution of the luminous source remain unchanged. It is possible by means of suitable electric circuits to connect the tubes to either one of the supply systems. If high voltage fluorescent tubes are used as a luminous source, a simple way of realization consists in the use for the supply of these tubes, operating under normal intensity (working as pilot lamps) of an open core transformer, which can be temporarily short-circuited during the period when the tubes are being supplied at high amperage, for the production of luminous flash during a short and predetermined time.

Regular fluorescent tubes may withstand for a short predetermined time magnitudes of current far in excess of their normal operating current. For instance, a tube with a normal operating current of $\frac{1}{10}$ ampere may be operated under 100 times this current rating for a predetermined period between $\frac{1}{10}$ and $\frac{1}{100}$ of a second.

In the preferred form of realization, where the generating impulse of the flash is obtained by the discharge of a battery of condensers into the primary of a transformer built for a given frequency (or with a variable adjustable frequency) while the secondary is connected to the terminals of the tubes, there is an advantage to have the transformer coils operate under an amperage far in excess of their normal one (for instance 2 to 10 times higher). This permits an economy in manufacturing without risking objectionable overheating, on account of the very short time during which the transformer is operating.

A flash of a relatively long duration obtained with the fluorescent gas tubes, gives the possibility of obtaining a penetration of the photographic emulsions and a luminous intensity better than those obtained with the electronic flash. It is easy to regulate the duration of the flash (time of exposure) by inserting one of a series of transformers designed to operate at different frequencies, for instance $\frac{1}{10}$, $\frac{1}{25}$, $\frac{1}{50}$, $\frac{1}{100}$ of a second. This gives the possibility to choose the most suitable time of exposure for the subject to be photographed.

According to the invention, a device permits not only the selection of the duration of the flash, but also the adjustment of the luminous intensity of the flash. If the capacity of the condensers (which through their discharge operate the fluorescent tubes) is altered, the amperage, or otherwise the rate of over-amperage applied to the tubes is equally changed.

In the preferred form of realization of the invention, all or part of the bank of condensers are used so that flashes of regularly growing or decreasing intensity may be obtained.

Thus, if the battery of condensers comprises, for instance, twelve condensers of suitable capacity, the tubes may be supplied with amperages of 10I, 20I, 30I, I being the normal operating amperage of the tubes (amperage under which the tubes operate as pilot lamps).

I have observed that, for certain photographic emulsions at least, the darkening curve is not always directly proportional to the amperage applied to the tube. I have also observed that better photographic results could be obtained if the subject was submitted to several successive flashes of a relatively low intensity, instead of using one flash of a luminous intensity equivalent to the sum of the intensities of successive flashes, the total duration of the flashes being similar in both cases.

The present invention concerns also electric, electronic and mechanical devices producing successive flashes, and particularly devices giving successive discharges of several condensers feeding into the same fluorescent tube at close and well-determined time intervals. The invention will be better understood at the reading of the description which follows and the study of drawings included, representing as an example without limitation, one of the possible methods of applying the invention.

In these drawings:

FIGURE 1 represents a diagram with a power-supply transformer, condensers, a small transformer, a main transformer and a light tube and gives one application of the invention;

FIGURE 2 partly represents a diagram with condensers, a main transformer governed by a small transformer and operating a light tube for setting purposes, and gives another application of the invention;

FIGURE 3 represents a diagram corresponding to the case when a sufficiently high power supply is used with only a small transformer and a condenser, and gives still another application of the invention;

Figure 9:
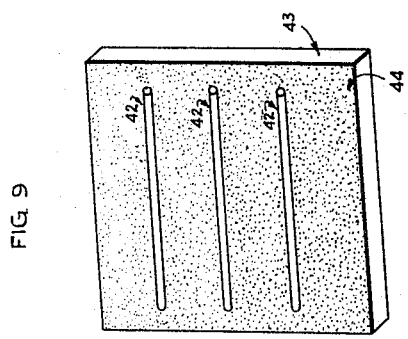
Figure 6:
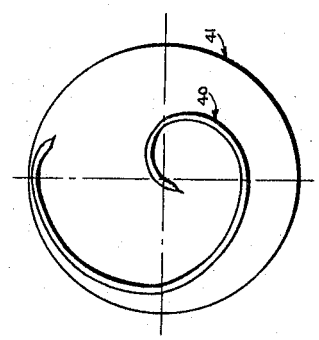
Figure 7:
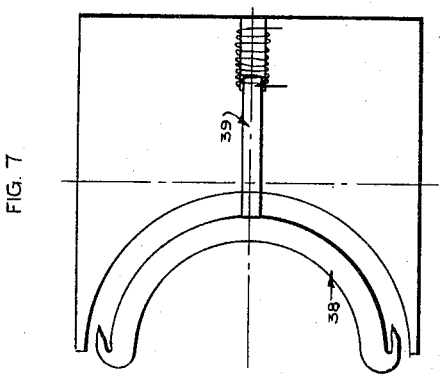
Figure 8:
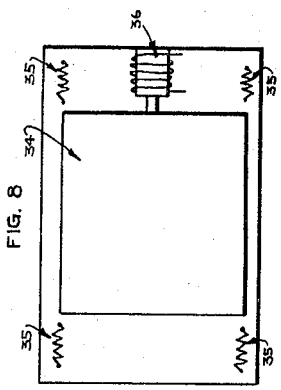

FIGURES 6, 7, and 8 show three embodiments in plan view of the manner of imparting movement to the light tube to obtain light diffusion;

FIGURE 9 is a perspective view of a stationary system to obtain light diffusion; and FIGURE 10 is a plan view of one form of the fluorescent tube; and FIGURE 11 is an enlarged view of one end of the fluorescent tube.

In the method of application shown on FIGURE 1, use is made as the luminous source of a fluorescent tube containing rare gas, indicated at 1, and forming a grid, the tube being, for instance, bent into a zig-zag, as shown in FIGURE 10. This tube 1 is able to produce a flash of high luminous intensity with a reflector of reduced area.

Use can be made of a "dusted" tube, that is a tube having a coating of fluorescent powder, with hot or cold cathode, usually called "neon tube," although it is generally filled with Argon. A square reflector of 30 cm. x 30 cm. may accommodate a normal tube with an outside diameter of 20 mm. and a length of 3 meters. This requires a supply voltage of 1,500 volts; the normal supply voltage being 500 volts per meter of tube with a current of 0.1 ampere for normal permanent operation.

The device includes a circuit supplied with normal current for tubes operating as pilot-lamps and an auxiliary circuit with high current for operation as flash-producing tubes. These two circuits may have common parts. The second circuit contains a battery of condensers 3, which can be connected through suitable switches, 4, 5, to the primary of an auto-transformer 7, the secondary 8 of which is connected to the terminals of the tube 1. According to a characteristic of the invention, the coils and the magnetic circuit of this auto-transformer are designed to operate at a determined frequency (60 cycles for instance), so that the impulsion sent to the tube 1 may have the desired duration. In the case described above, a tube having a length of 3 meters, requires a transformer of 500/1,500 v., if the condensers 3 are charged at 500 volts.

According to another characteristic of the invention, the auto-transformer 7 can be made with the use of wire having considerably smaller sections (from 2 to 10 times smaller for instance) than the wire of a transformer operating permanently. This is due to the fact tha the duration of time when the transformer is operating is very considerably reduced as compared with the time and the photographic setting required for the charging of the condensers.

The main supply circuit for operation as pilot-lamp includes a transformer 9 with a primary connected to the alternating network 10, while its secondary supplies the luminous tube 1 under its normal voltage and amperage corresponding to a permanent operation (1,500 volts, 0.1 ampere in the case above-mentioned). It is convenient to select an open core transformer 9 with a secondary which may be temporarily short-circuited by means of contact 5' without any resulting damage when the related contact 5, regulating the discharge of condensers 3 into the primary 6 of transformer 7, is closed to obtain the flash. The switches 5–5' can be hand-operated, but it is preferable, as shown on FIGURE 1, to have it operated by a relay 11, governed by contacts 12–12' triggered by the camera click. In the closed position of switch 12', the meter 13 allows the operator to check the charge of the battery of condensers.

The whole circuit is completed by a classic rectifier circuit, indicated by the general reference 14, and containing for instance a thermionic tube 15 for the charging of condensers 3 and a smaller thermionic tube 16 for the supply of relay 11. The rectifier circuit is connected to the network 10. To easily regulate the intensity of the luminous flash, the bank of condensers is divided into a certain number of parts (4 in the above-mention example) which can be switched in or out by means of the dividers 4, 4′, 4″.

Tube 1 can have the shape of a grid, as seen on FIGURE 10, but it is well understood that a light source having any desired shape can be realized. Several grid-shaped tubes can be connected into series, so as to obtain several sources of light, or arranged in such a manner as to produce a soft and dispersed light. (Tubes would be spaced further apart.) The light can be coloured by using the existing variety of coloured-fluorescent tubes, especially cold cathode tubes.

This, according to the invention, permits precise setting and timing, because the light of the pilot-lamp and that of the flash-lamp are produced by the same luminous source. In FIGURE 2, another method of setting is partially represented. The auto-transformer 7 is supplied by two sources: a small transformer 17, supplying tube 1 with the necessary light for the setting, and thus making it into a pilot-lamp and the condensers 3 supplying the current for the flash. Thus, the flash is triggered through the relay 11, by the reversing switch 18.

In the methods described above, we use an auto-transformer, built for a given frequency, to determine the flash duration, but one or several classic transformers may be used equally well. These may contain regulating spirals at their primary and secondary and thus produce flashes of two or more different durations, with the use of the transformer only. More generally, it is sufficient to insert a reactance of suitable value between the bank of condensers and the tubes. In FIGURE 3, a reactance 19 gives in tube 1 flashes of short duration by the discharge of the condensers 3.

In the preferred form of realization, fluorescent tubes with cold cathode are used. These can easily be bent and are available in the desired length and colour.

However, fluorescent tubes with hot cathode can also be used, but these can only be formed in large diameter circles. It is desirable to equip each electrode with a reinforced contact of molybdenum or tungsten within the tube screen surrounding the filaments, and a similarly reinforced exit conductor, so as to absorb the over-amperage at the moment of the flash, the conventional cathodes being kept for the functioning as pilot-lamp.

Filaments of hot cathode lamps are, usually, surrounded by a screen. I have noted that this screen could be used as a supplementary electrode. This makes it possible for photographers to adapt their existing studio lighting, which has been adapted to flash operation, for setting purposes and for flash, alternatively.

Figure 4:
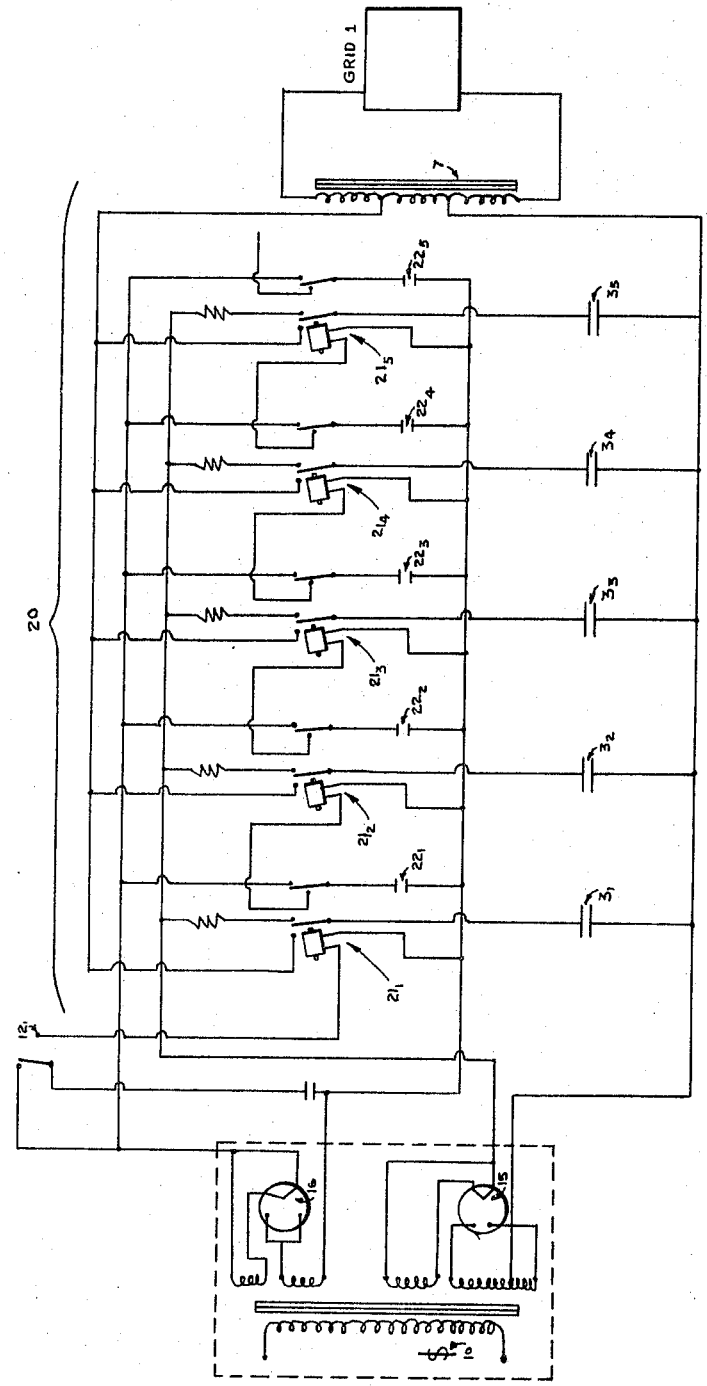
FIGURE 4 represents a diagram with a power-supply transformer, a succession of condensers and relays, governing the main transformer operating a light tube, and gives another application of the invention.

FIGURE 4 gives a diagram, according to the invention, to produce successive flashes at brief intervals. This setting is generally similar to those of FIGURE 1 and FIGURE 2, but contains a circuit, under the general reference 20, producing successive discharges of condensers $3_1$, $3_2$, $3_3$, $3_4$, $3_5$. The supply circuit of tube 1, under normal current, for operation as pilot-lamp, is not represented, this circuit being identical to those described above.

The discharge of a condenser of small capacity 22 into the coil of relay 21, triggers the discharge of the next small condenser and the closing of the next relay, and so forth. The intervals between the successive flashes are then governed by the delay of response from relay 21 and the following and successive discharges of condensers 31 to 35 at short intervals into auto-transformer 7 are obtained by closing contact 12′, operating relay 21.

The light penetration of photographic emulsion, particularly of a colour emulsion, made of several layers, is more efficient with successive discharges of the ($n$) condensers (with ($n$) luminous flashes), than with only one flash of an intensity ($n$) times higher, obtained by a simultaneous discharge of the ($n$) condensers mounted in parallel. It has been noted that this successive discharge is sufficient to greatly improve penetration of the emulsion.

Transformer 7, giving a flash lasting $1/100$ of a second, can produce three flashes within $1/25$ of a second. In FIGURE 4, a purely electric realization of the device 20 is represented, producing successive discharges (flashes). The same result can be obtained through mechanical or electro-mechanical methods, such as contacts rotating at high speed and successively discharging the condensers. The number of successive flashes is then determined mechanically or electrically.

Photographic magnifiers are used in the photographic industry, where an electric power sufficient for their operation is provided. In this particular case, the apparatus can be simplified.

Figure 5:
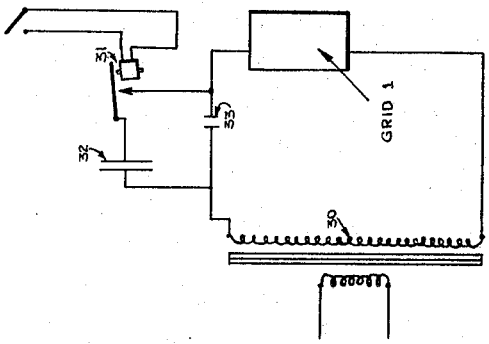
FIGURE 5 shows a diagram of another system of the invention.

The power supply transformer of the fluorescent tube 1 can be directly supplied by the power line. To that effect, a self inductance or a condenser have been provided for setting purposes. We have used, as an example, a condenser of 0.3 mf., which produced normal current of 0.1 ampere, necessary for the operation of the pilot-lamp. FIGURE 5, partly represents a diagram with the main transformer 30, a relay 31, a large condenser 32, and a small condenser 33 with a light tube 1, and gives an application of the invention. For an intense lighting, the relay 31 puts condenser 32 of, say 12 mf., in parallel with the small condenser 33. The timing of lighting can be set either by hand, by a time-switch, or by an othotrone lamp.

When photographic magnifiers are operated, a shield of frosted or translucent glass must be employed in order to diffuse the light emitted by the tubes. However, this glass absorbs up to 93 percent of the light power.

This has been successfully overcome in accordance with the invention, by two different methods:

*1st method: by giving a movement to the grid or fluorescent tube.*—(A) An important luminous inertia of the tubes has been noted. These remain luminescent for a certain period of time after being shut off. When a fluorescent tube, suspended by springs, without frosted glass is being vibrated by hand, a picture could be taken in a far shorter time than with the use of frosted glass and ordinary stationary fluorescent tube.

The same movement can be applied by an electromagnet. FIGURE 8 represents a sketch with a fluorescent tube 34, mounted on springs 35 operated by an electro-magnet 36. FIGURE 7 represents a sketch of a curved tube 38, mounted on a rotating shaft 39 and FIGURE 6 represents a sketch of a spiral tube 40 fixed to a flat rotating surface 41. These three figures represent three different applications of the invention.

*2nd method: by replacing the shield of frosted glass by a shield of dusted glass.*—The term "dusted glass" means transparent glass coated with a layer of fluorescent material in powder form and adhering thereto by means of a suitable glue. These coatings are conventional and are used for coating the inside of fluorescent tubes.

In this case, the luminous grid consists of tubes capable of emitting ultra-violet rays (for instance, quartz tubes).

For my experiments, I used "germicide" tubes, easy to find on the market at a low cost. These tubes, as shown at 42 in FIG. 9, are disposed adjacent the back face of shield 43 of transparent glass coated on its back face 44 with a fluorescent coating. Thus, the light from tubes 42 passes through shield 43 and its coating to impinge on the photographic subject. The efficiency of this system has proved to be perfect.

In that case, different kinds of fluorescent powders can be used to obtain the various colours needed.

It should be understood that the invention is in no way limited to the described examples and can be subjected to many variations, depending upon different fields of application, without the spirit of the invention being impaired.

What I claim is:

1. Apparatus for producing light for photographic work, comprising in combination a rare gas filled ultra violet ray emitting tube, a transparent pane disposed between said tube and the object to be illuminated, said pane being coated on at least one face thereof with a fluorescent powder, electrical supply circuit means including a plurality of condensers, an auto-transformer connected to said tube and to said condensers, switching means and delay means for successively discharging said condensers into said tube, through said auto-transformer, to thereby produce a rapid succession of short electrical impulses of predetermined duration having an amperage considerably higher than the normal operating amperage of said tube, resulting in a rapid succession of luminous flashes produced by said tube and said coated pane.

2. Apparatus as claimed in claim 1, wherein the coating of said fluorescent powder is on the face of said pane next to said tube.

References Cited by the Examiner

UNITED STATES PATENTS

| | | | |
|---|---|---|---|
| 1,379,949 | 5/1921 | Wedmark | 88—24 |
| 1,939,332 | 12/1933 | Bouwers et al. | 315—240 X |
| 2,178,423 | 10/1939 | Inman | 315—241 |
| 2,609,523 | 9/1952 | Stein et al. | 315—241 |
| 2,747,459 | 5/1956 | Morrison | 88—24 |
| 2,873,408 | 2/1959 | Parker et al. | 315—183 |
| 2,917,668 | 12/1959 | Witterson | 315—241 |
| 3,123,738 | 3/1964 | Oswald | 315—241 X |

FOREIGN PATENTS 1,276,781  10/1961  France.

JOHN W. HUCKERT, *Primary Examiner.*

A. M. LESNIAK, *Assistant Examiner.*